(12) United States Patent
Spearing

(10) Patent No.: US 8,067,917 B2
(45) Date of Patent: Nov. 29, 2011

(54) HYSTERESIS MITIGATION AND CONTROL METHOD

(75) Inventor: Ian Spearing, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 472 days.

(21) Appl. No.: 12/416,534

(22) Filed: Apr. 1, 2009

(65) Prior Publication Data

US 2009/0251094 A1 Oct. 8, 2009

Related U.S. Application Data

(60) Provisional application No. 61/043,192, filed on Apr. 8, 2008.

(51) Int. Cl.
*G05B 11/06* (2006.01)
(52) U.S. Cl. ........ 318/590; 318/135; 318/596; 318/609; 318/610; 318/624
(58) Field of Classification Search ........... 318/590, 318/135, 596, 609, 616, 617, 618, 620, 624
See application file for complete search history.

(56) References Cited

U.S. PATENT DOCUMENTS

| | | | |
|---|---|---|---|
| 3,427,442 A | | 2/1969 | Sklaroff |
| 3,555,252 A | | 1/1971 | Garden |
| 4,455,512 A | | 6/1984 | Cornwell et al. |
| 4,546,426 A | | 10/1985 | Hafner et al. |
| 4,628,233 A | * | 12/1986 | Bradus ..................... 388/809 |
| 4,901,625 A | * | 2/1990 | Bussan et al. ................ 91/361 |
| 5,119,866 A | | 6/1992 | Mihara |
| 5,687,098 A | | 11/1997 | Grumstrup et al. |
| 5,745,084 A | | 4/1998 | Lusignan |
| 5,810,095 A | | 9/1998 | Orbach et al. |
| 5,999,853 A | | 12/1999 | Stoop et al. |
| 6,094,602 A | | 7/2000 | Schade, III |

(Continued)

FOREIGN PATENT DOCUMENTS

DE 102007001186 A1 7/2008

(Continued)

OTHER PUBLICATIONS

Valve hysteresis compensation considering flow conditions for digital valve positioner, Wakui, T.; Hashizume, T.; Nishijima, T. SICE 2004 Annual Conference; vol. 2, Aug. 4-6, 2004 pp. 1507a-1507f vol. 2.

*Primary Examiner* — Rita Leykin
(74) *Attorney, Agent, or Firm* — Harness, Dickey & Pierce, P.L.C.

(57) ABSTRACT

A system and control method mitigates hysteresis of an adjustable component in the system. A control module can allow small control changes to be effected to the component within limits of the component's and/or the system's normal hysteresis band. The control method can allow finer, more accurate and more aggressive control to be obtained from the component. The system and method can utilize two separate control regimes to control adjustments to the component. The first control regime can control changes larger than a hysteresis band and/or changes in a same direction as the last adjustment that was performed with the first control regime. The first control regime can be a feedback-based adjustment to the component. The second control regime can be utilized to control changes within the hysteresis band. The second control regime can use open-loop based adjustments to the component.

32 Claims, 6 Drawing Sheets

U.S. PATENT DOCUMENTS

| | | | |
|---|---|---|---|
| 6,155,283 A * | 12/2000 | Hansen et al. | 137/1 |
| 6,272,401 B1 | 8/2001 | Boger et al. | |
| 6,581,847 B2 * | 6/2003 | Kline et al. | 236/49.3 |
| 6,716,359 B1 | 4/2004 | Dennis, II | |
| 6,717,443 B2 * | 4/2004 | Barnes | 327/51 |
| 6,745,084 B2 | 6/2004 | Boger et al. | |
| 6,819,520 B2 | 11/2004 | Carley | |
| 6,962,164 B2 | 11/2005 | Lull et al. | |
| 6,975,087 B1 * | 12/2005 | Crabill et al. | 318/590 |
| 6,999,853 B2 | 2/2006 | Junk et al. | |
| 7,024,336 B2 * | 4/2006 | Salsbury et al. | 702/182 |
| 7,039,537 B2 | 5/2006 | Junk | |
| 7,089,086 B2 | 8/2006 | Schoonover | |
| 7,528,590 B2 * | 5/2009 | Wei | 323/282 |
| 7,622,963 B2 * | 11/2009 | Westwick | 327/90 |
| 7,768,242 B2 * | 8/2010 | Wei et al. | 323/222 |

FOREIGN PATENT DOCUMENTS

| | | |
|---|---|---|
| JP | 63246582 A | 10/1988 |
| JP | 03272304 A | 12/1991 |

* cited by examiner

HYSTERESIS MITIGATION AND CONTROL METHOD

CROSS-REFERENCE TO RELATED APPLICATION

This application claims the benefit of U.S. Provisional Application No. 61/043,192, filed on Apr. 8, 2008. The entire disclosure of the above application is incorporated herein by reference.

FIELD

The present teachings relates to hysteresis and, more particularly, to mitigation of hysteresis and a control method for same.

BACKGROUND

The statements in this section merely provide background information related to the present teachings and may not constitute prior art.

Moveable components, such as control valves, have performance limitations due to hysteresis. In the case of a valve, the hysteresis is a limitation of the valve to return to a specific control output given an identical control input. For example, the ability of the valve to return to a specific control output, given an identical control input, can vary depending upon whether the control point is approached from below or approached from above. In other words, if a control input to the valve is a command to go 50% open, the valve may go to 48% open when approaching the control point, from say 40% open originally, and may go to 52% open when approaching the control point, from say 60% open originally, giving a hysteresis of ±2%.

The hysteresis, in the case of a valve, can be caused by several factors. The factors can include, by way of non-limiting example, mechanical slop in the valve linkages, mechanical slop in the feedback linkages, mechanical or electrical slop in the feedback sensor, mechanical backlash, and imposed software hysteresis bands or "dead band" for a given closeness of the desired control point compared to the feedback signal from the valve, etc., or some combination thereof, depending on the particulars of the valve and control methodology. The "dead band" can be considered to be a region wherein the valve is close enough to the actual/desired value that the control system will not call for any further changes to the valve position.

In some applications, depending on the loading conditions and other factors, the hysteresis can prevent proper control of the system, in particular when small changes in control are required to adjust about a setpoint to account for setpoint variations or to mitigate the effects of disturbances. The hysteresis can lead to either no output change for small control input change, or to excessive change for a small control input change. Both situations can lead to the output not matching the desired control point.

To reduce the hysteresis for a component, expensive precise control linkages and mechanisms can be utilized to reduce the mechanical slop. Additionally, better performing or more precise sensors can also be utilized to reduce the electrical slop in the feedback loop. The result, however, can be a control arrangement that is expensive and increases the overall costs of the system within which the component and the associated control system are utilized.

SUMMARY

The present teachings reduce and/or mitigate the effects of hysteresis on the output of a device. The present teachings can overcome some of the limitations of hysteresis in a component using software control improvements to allow small control changes to be effected within the limits of the component's, such as a valve's, normal hysteresis band. The present teachings can allow finer, more accurate and more aggressive control to be obtained from the component. The improved control can be achieved without requiring a more expensive component wherein special steps have been taken to remove the mechanical and/or electronic contributions to hysteresis. The present teachings can thereby provide increased performance for a component without requiring the expensive mechanical linkages and/or sensors to reduce the hysteresis.

A control system according to the present teachings utilizes two separate control regimes to control changes to the operational state of the component. A first control regime can control changes larger than the hysteresis band and/or changes in the same direction as the last change that was performed with the first control regime. The first control regime can be a feedback-based control regime. The second control regime can be utilized to control changes within the hysteresis band. The second control regime can use open-loop based adjustments, such as time-based movement by way of non-limiting example. In this manner, the present teachings can reduce the effective hysteresis of a component, allowing small, repeatable control changes about a setpoint by dividing the control effort into two regimes.

A hysteresis mitigation and control method for a system having an adjustable component according to the present teachings includes determining if a change in an operational state of the component is required. The method also includes ascertaining whether to implement a first control regime or a second control regime when the determination is indicative of a required change. One of the first and second control regimes is implemented based on the ascertainment. The first control regime is a closed-loop, feedback-based adjustment to the component and the second control regime is an open-loop based adjustment to the component.

A system according to the present teachings can include a component having an adjustable operational state and a control module that controls adjustment of the component. The control module determines if a change in an operational state of the component is required, ascertains whether to implement a first control regime or a second control regime when it is determined that a change is required, and implements one of the first and second control regimes when adjusting the operational state of the component. The first control regime is a closed-loop, feedback-based adjustment to the component and the second control regime is an open-loop based adjustment to the component.

In some embodiments, ascertaining can include comparing the required change to a hysteresis characteristic of at least one of the component and the system. One of the first or second control regimes is implemented based on the comparison to the hysteresis characteristic.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

The following description is merely exemplary in nature and is not intended to limit the present teachings, applications, or uses. As used herein, the term "module" refers to an application-specific integrated circuit (ASIC), an electronic circuit, a processor (shared, dedicated, or group) and memory that execute one or more software or firmware programs, a combinational logic circuit, or other suitable components that provide the described functionality.

Figure 2:
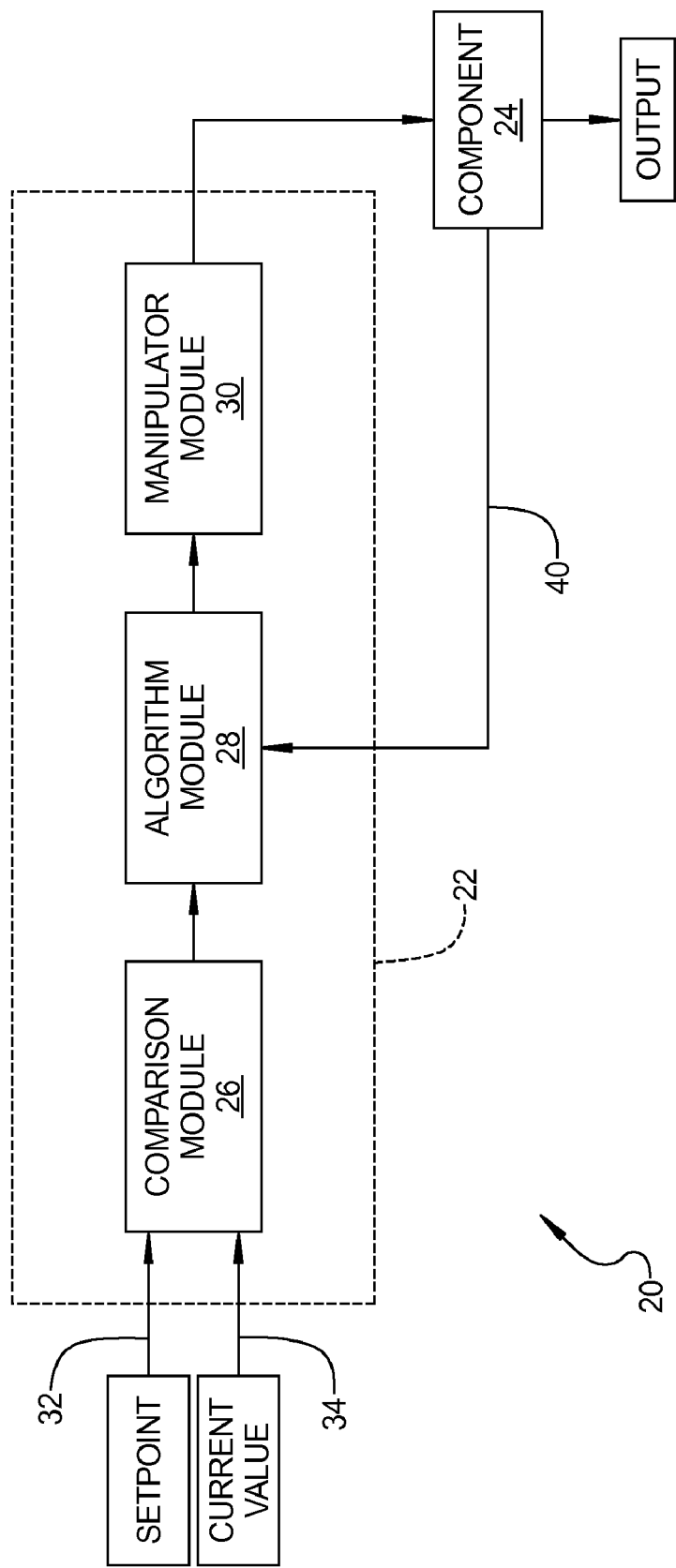
FIG. 2 is a simplified representation of a control system according to the present teachings.

Referring to FIG. 2, an exemplary control system 20 according to the present teachings is shown. Control system 20 includes a control module 22 that is operable to control an automatically actuated component 24 using the first and second control regimes according to the present teachings. Control module 22 can be a single module operable to perform the described functionality; a plurality of integrated modules, as shown, that can perform the described functionality; a combination of integrated and individual modules that can perform the described functionality; and/or one or more individual modules that can perform the described functionality. Thus, control module 22 shown and described herein is merely exemplary in nature and is not intended to limit the scope of the present teachings.

As stated above, control module 22 can include a plurality of integrated modules that perform the described functionality. By way of non-limiting example, control module 22 can include a comparison module 26, an algorithm module 28, and a manipulator module 30. Comparison module 26 can receive a setpoint signal 32 along with a current value signal 34. The current value signal 34 is indicative of the current value of the primary control target (variable or parameter) for which control system 20 is trying to control. The setpoint signal 32 is indicative of the desired value of the primary control target that control system 20 is trying to achieve. The primary control target can vary, depending upon the application within which control system 20 is utilized. For example, the primary control target can be a reference temperature, a flow rate, a pressure, and the like, by way of non-limiting example. Setpoint signal 32 can, by way of non-limiting example, be provided by a control panel, an operator input, an input device, or another module that is utilized in the system within which component 24 is disposed. The current value signal 34 can be provided by one or more sensors or other modules that can monitor the current value of the primary control target and provide a signal indicative of its value.

It should be appreciated that the primary control target can be a target that is directly or indirectly related to component 24. A direct relation is indicative of a relationship wherein the primary control target is a direct position, level, value or other characteristic of component 24. An indirect relation is indicative of a relationship wherein the primary control target is affected by a particular characteristic of component 24 but is not a specific characteristic for component 24. A non-limiting example of an indirect relation can be wherein the primary control target is a temperature and operation of component 24 alters a fluid flow rate that can affect the temperature. As a result, by controlling the position of component 24 and the flow rate therethrough, a desired temperature for the primary control target may be achieved. In this example, the setpoint signal 32 is indicative of the desired temperature for the primary control target and the current value signal 34 is indicative of the actual temperature of the primary control target. Thus, the primary control target can be directly or indirectly related to the characteristics of component 24. It should also be appreciated that other factors can affect the actual value of the primary control target other than the characteristics of component 24 when there is an indirect relationship.

Comparison module 26 is operable to compare the current value signal 34 to the setpoint signal 32 and ascertain the difference therebetween. Comparison module 26 can provide the results of the comparison to algorithm module 28. Algorithm module 28 is operable to use the input from comparison module 26 to implement the appropriate control regime for component 24. In particular, algorithm module 28 can determine if a change in the operation of component 24 is necessary to achieve the desired setpoint for the primary control target. Additionally, algorithm module 28 can determine what change to make to component 24 in an attempt to achieve the primary target setpoint. Algorithm module 28 will employ either the first or second control regime, depending upon the change in operation of component 24 that is needed to achieve the primary target setpoint, as described below.

Algorithm module 28 can receive a feedback signal 40 from component 24. Feedback signal 40 can be indicative of the current operating condition of component 24. Algorithm module 28 can utilize feedback signal 40 in conjunction with the control regimes to determine whether an adjustment to the operation of component 24 is needed. Feedback signal 40 can be indicative of a position of component 24, by way of non-limiting example. Feedback signal 40 can be provided by one or more sensors that provide signals indicative of the current operating condition of component 24. Feedback signal 40 is subject to the hysteresis described above and, as a result, can provide a signal that is representative of the current operating condition of component 24, subject to the hysteresis.

Algorithm module 28 provides the appropriate signal to manipulator module 30 when a change in the operation of component 24 is desired. Manipulator module 30 utilizes the signal from algorithm module 28 to command a change in the operation of component 24, as described below.

Figure 1:
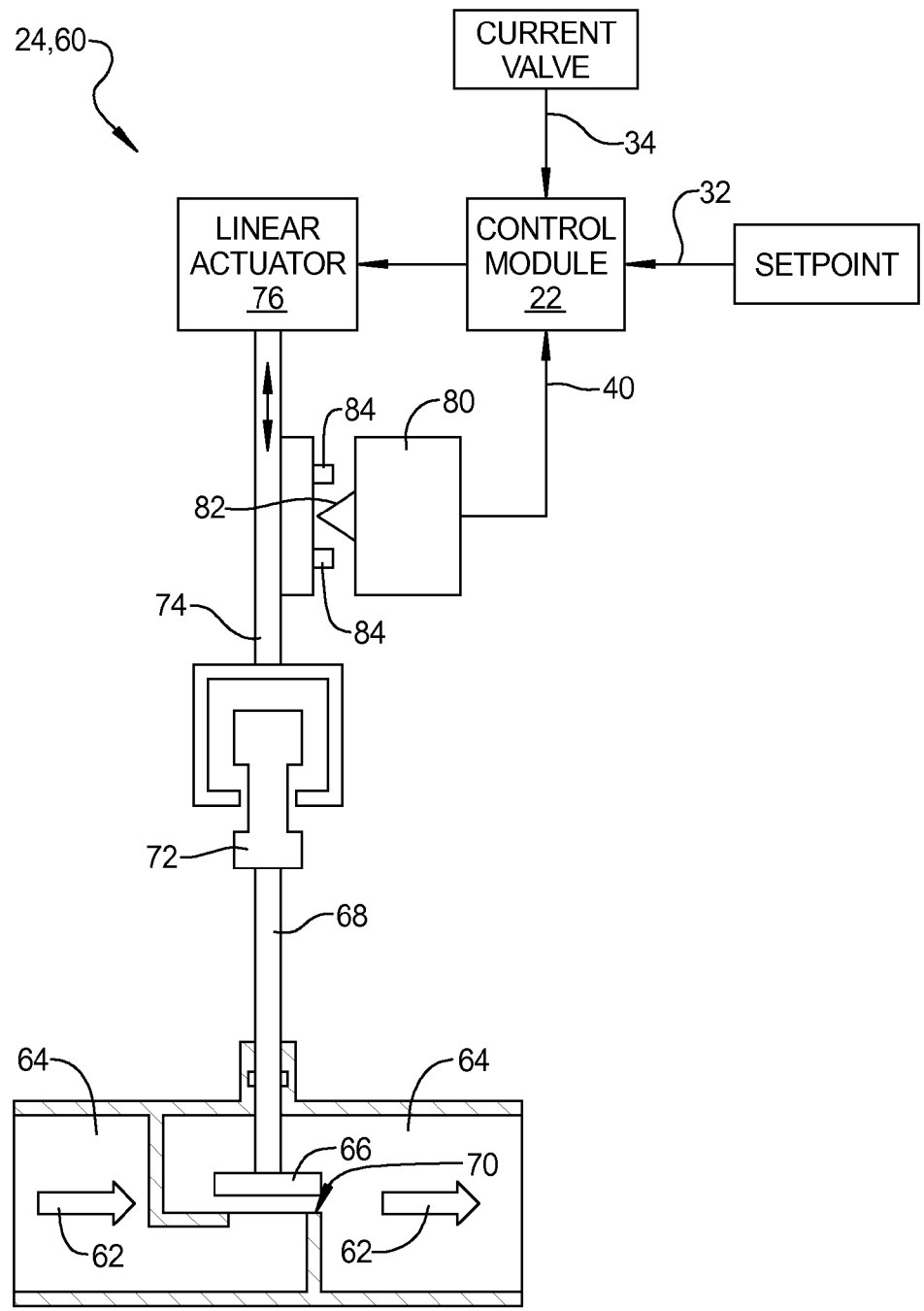
FIG. 1 is a simplified representation of an exemplary automatically actuated component, in this case in the form of a control valve, that can be controlled by a control system and method according to the present teachings.

Referring now to FIG. 1, control module 22 is shown as being utilized with a component 24 which is in the form of a control valve 60. Control valve 60 can be used to control a fluid flow 62 through a flow path 64 of control valve 60. A valve seal 66 is attached to a valve stem 68 and can be moved within flow path 64 to engage and disengage with a valve seat 70. The spacing between valve seal 66 and valve seat 70 can alter the rate of fluid flow 62 through flow path 64.

Valve stem 68 is coupled to a stem link 72 which, in turn, is coupled to an actuator link 74. The engagement between stem link 72 and actuator link 74 results in some mechanical slop that can contribute to the overall hysteresis of control valve 60.

Actuator link 74 is coupled to an actuator 76, such as a linear actuator, by way of non-limiting example. Actuator 76 can move actuator link 74 which, in turn, drives movement of stem link 72. Movement of stem link 72 drives movement of valve seal 66 within flow path 64. As a result, actuator 76 can drive movement of valve seal 66 to change the rate of fluid flow 62 through control valve 60.

Control valve 60 can include a feedback sensor 80 that can provide a feedback signal 40 to control module 22. Feedback sensor 80 can take a variety of forms. By way of non-limiting example, feedback sensor 80 can include a potentiometer, whose resistance changes as a function of the position of valve seal 66, and a linear variable differential transformer that can provide a signal indicative of the position of valve seal 66. Feedback sensor 80 can be coupled to actuator link 74. Feedback sensor 80 can include a pickup 82 which is responsive to movement of actuator link 74 through interaction with projections 84 coupled thereto. As can be seen, some movement of actuator link 74 is possible without one of the projections 84 contacting pickup 82 and results in sensor slop that can contribute to the overall hysteresis of control valve 60. In other embodiments, feedback sensor 80 can be coupled to linear actuator 76, stem link 72, and valve stem 68, by way of non-limiting example, each of which may have different mechanical or electrical hysteresis constraints and limits. It should be appreciated that the sensor arrangement shown for control valve 60 is merely exemplary in nature and that other sensors and position feedback devices can be utilized. Additionally, it should be appreciated that digital sensor feedback sensors can also be employed along with analog feedback sensors.

Control module 22 commands linear actuator 76 to adjust fluid flow 62 through control valve 60. Control module 22 commands the operation of linear actuator 76 based upon setpoint signal 32, current value signal 34, and utilizing one of the first and second control regimes, as discussed below.

Figure 3:
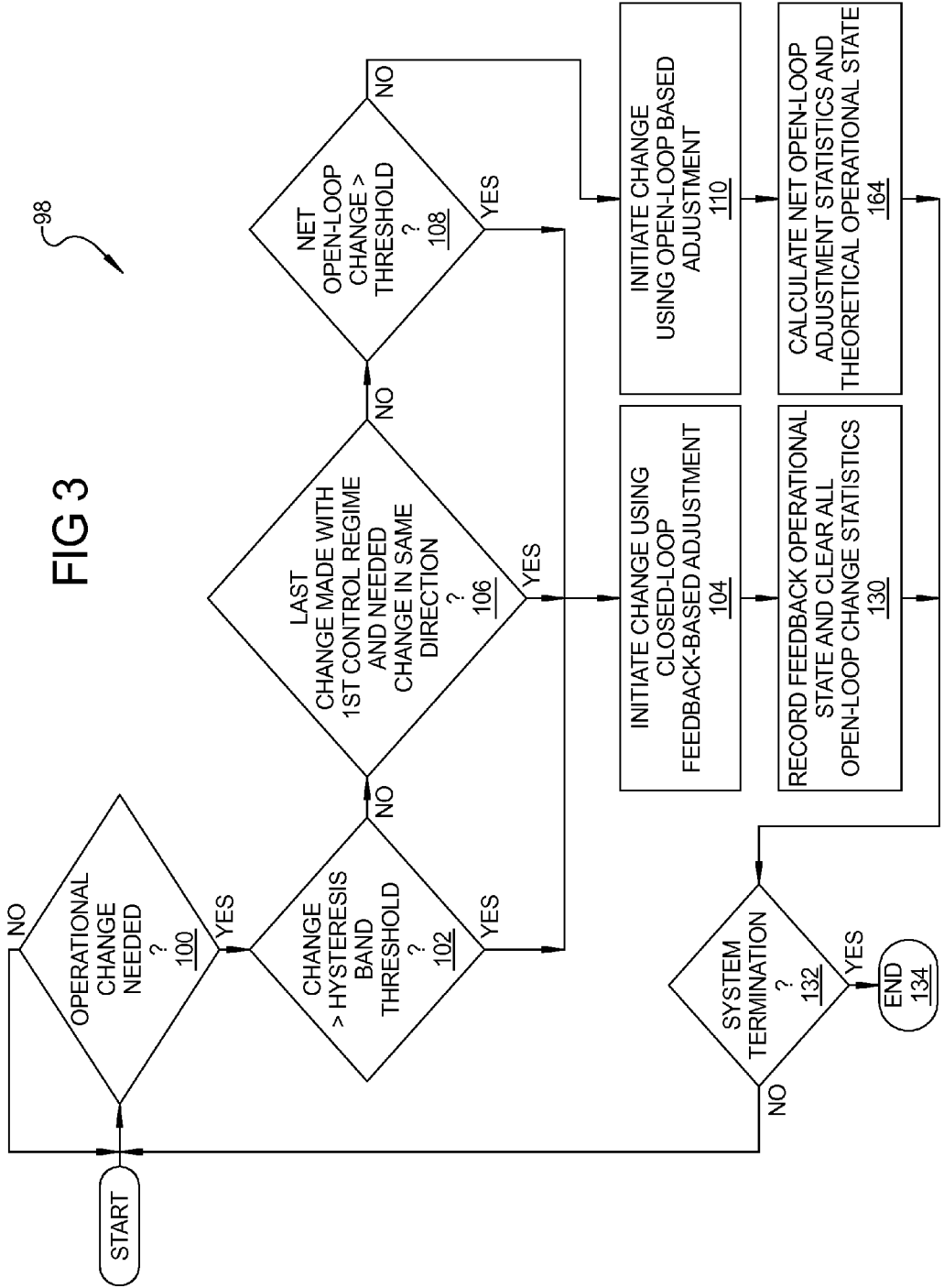
FIG. 3 is a flow chart of the methodology of the control system according to the present teachings.

Referring now to FIGS. 3-6, flow charts illustrating the control methodology and control regimes according to the present teachings that may be implemented by control system 20 are shown. Referring first to FIG. 3, control includes a main control loop 98 and begins by ascertaining if an operational change is needed, as indicated in decision block 100. Whether an operational change is needed or not can be ascertained by comparison module 26 based on a difference between setpoint signal 32 and current value signal 34. In other embodiments, whether an operational change is needed or not can be ascertained by comparison module 26 based on a rate of change of current value signal 34, time interval of difference between setpoint signal 32 and current value signal 34, fuzzy logic, or other means to determine if an operational change is necessary, by way of non-limiting example. When an operational change is not needed, control continues to monitor whether an operational change is needed.

When an operational change is needed, as determined in decision block 100, control ascertains if the change is greater than a hysteresis characteristic, such as the hysteresis band threshold, of component 24 and/or control system 20, as indicated in decision block 102. If the change is greater than the hysteresis band threshold, control moves to block 104 and implements the first control regime, as described below. The hysteresis band threshold is chosen to be indicative of the hysteresis of component 24 and/or control system 20 and to reflect a magnitude of change within which the first control regime may not be as effective as the second control regime.

If the change is less than the hysteresis band threshold, as indicated in decision block 102, control ascertains if the last change was implemented by the first control regime and if the needed change in component 24 calls for a further change in the same direction as its previous change, as indicated in decision block 106. If both of these conditions are true, control moves to block 104 and implements the first control regime, as described below.

If either of the conditions in decision block 106 is not met, control ascertains if the net open-loop change is greater than a threshold value, as indicated in decision block 108. The net open-loop change is the change implemented using the second control regime, as described below. The net open-loop change threshold value is selected to be indicative of a value above which the use of the second control regime is no longer to be used. If the net open-loop change is greater than the threshold value, control moves to block 104 and implements the first control regime, as described below. If the net open-loop change is less than the threshold value, as indicated in decision block 108, control moves to block 110 and implements the second control regime, as described below.

Thus, main control loop 98 will only implement the second control regime if the following conditions are met: (1) The needed change is less than the hysteresis band threshold, as indicated in decision block 102; (2) The last change was not made with the first control regime or the current needed change is in a different direction than the last change, as indicated in decision block 106; and (3) The net open-loop change is less than the threshold value, as indicated in block 108. When main control loop 98 cannot implement the second control regime, main control loop 98 will implement the first control regime.

Figure 4:
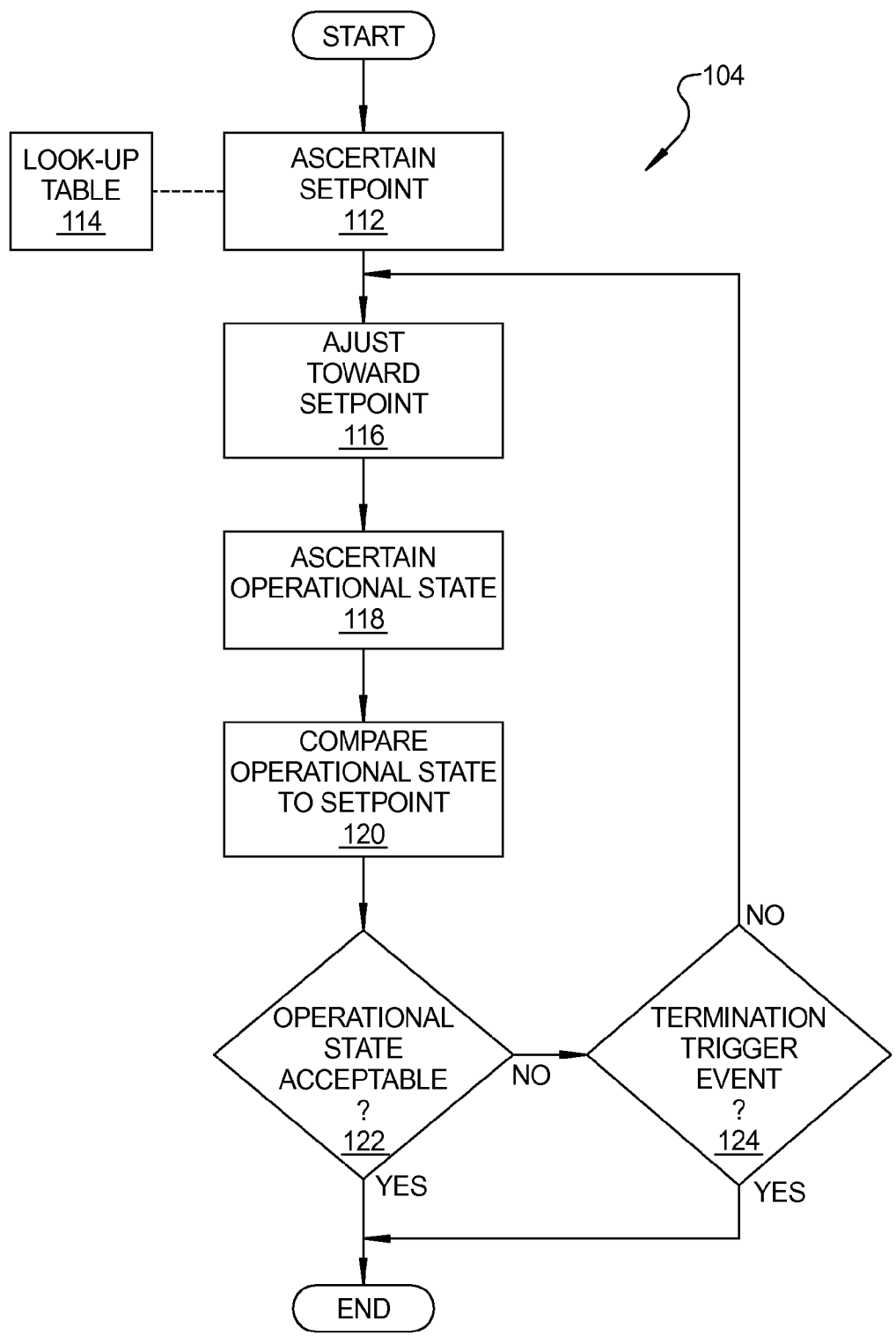
FIG. 4 is a flow chart illustrating a first control regime utilized by the control system according to the present teachings.

The first control regime, as indicated in block 104, is a change using closed-loop feedback-based control. The details of first control regime 104 are shown in FIG. 4. The first control regime 104 begins by ascertaining the setpoint for component 24 to achieve the primary control target, as indicated in block 112. The appropriate setpoint for component 24 to achieve the primary control target can be based upon a relationship (direct or indirect, as described above) between an operational state, such as a position by way of non-limiting example, of component 24 and the value of the primary control target. A variety of methods can be utilized to determine the appropriate setpoint for component 24. By way of non-limiting example, the relationship can be contained in a look-up table 114 that algorithm module 28 accesses to determine the appropriate new setpoint for component 24 based on the comparison between the primary control target setpoint signal 32 and the primary control target current value signal 34. The ascertained setpoint is an operational state for component 24 and is not necessarily the same as setpoint signal 32 or current value signal 34. It should be appreciated that the use of a look-up table 114 is optional and that other methods of ascertaining the setpoint for component 24 can be implemented. By way of non-limiting example, such other methods can include the use of PID control, fuzzy logic, model-based control algorithms, and/or pulse-width-modulation type control/output.

Once the setpoint for component 24 has been ascertained, control commands component 24 to adjust toward the setpoint, as indicated in block 116. Manipulator module 30 can be utilized to command component 24 to make the appropriate change.

Control then ascertains the operational state of component 24, as indicated in block 118. The ascertained operational state can be provided by feedback signal 40.

Next, control compares the ascertained operational state of component 24 to the setpoint operational state of component 24, as indicated in block 120. Control determines if the operational state is acceptable based on the comparison, as indicated in decision block 122. If the operational state is acceptable, control terminates the implementation of first control regime 104 and returns to main control loop 98, as described below.

If control determines that the operational state is not acceptable, as indicated in decision block 122, the control then ascertains if a trigger event has occurred that would command the termination of first control regime 104, as indicated in decision block 124. The termination trigger events are events that require the current control regime, in this case the first control regime 104, to be terminated prior to completing their appropriate task. The trigger events, by way of non-limiting example, can include receiving of a new setpoint signal 32 or current value signal 34 that requires control to return to main loop 98, a time-based limitation, an interrupt signal from the system within which control system 20 is utilized, an over-ride condition, as a result of a fault or error, and the like.

If control ascertains, in decision block 124, that a termination trigger event has not occurred, control returns to block 116 and continues to command component 24 to adjust toward the setpoint. Control continues to implement the first control regime 104, until an acceptable operational state has been achieved, as indicated in decision block 122, or a termination trigger event has occurred, as indicated in decision block 124.

Thus, first control regime 104 can ascertain a setpoint for component 24 that should achieve the desired value for the primary control target. First control regime 104 commands adjustment of component 24 to change its operation to achieve the primary control target. A feedback loop is utilized to drive adjustment of component 24 to the setpoint. It should be appreciated that the first control regime 104 is subject to the hysteresis of component 24 and/or of control system 20.

When control terminates implementation of first control regime 104, control moves to block 130, as shown in FIG. 3. In block 130, control records the feedback operational state and clears all open-loop change statistics that may have been previously generated in the second control regime 110. The open-loop change statistics that are cleared are utilized in second control regime 110, described below. Control may also set the ascertained current operational state (based on feedback signal 40) as the initial starting state for the second control regime 110, as described below. After clearing the open-loop change statistics and ascertaining the operational state of component 24, control ascertains if a system termination event has occurred, as indicated in decision block 132. The system termination decision is utilized to terminate main control loop 98 and the operation of control system 20. For example, the system termination decision can be based upon the system within which control system 20 is being utilized being shut down, or the particular functionality of control system 20 no longer being needed at that time. If a system termination event occurs, control ends, as indicated in block 134. If a system termination event has not occurred, control returns to decision block 100 and ascertains if an operational change is needed, utilizing the known operational state of component 24 as determined in block 130.

Figure 5:
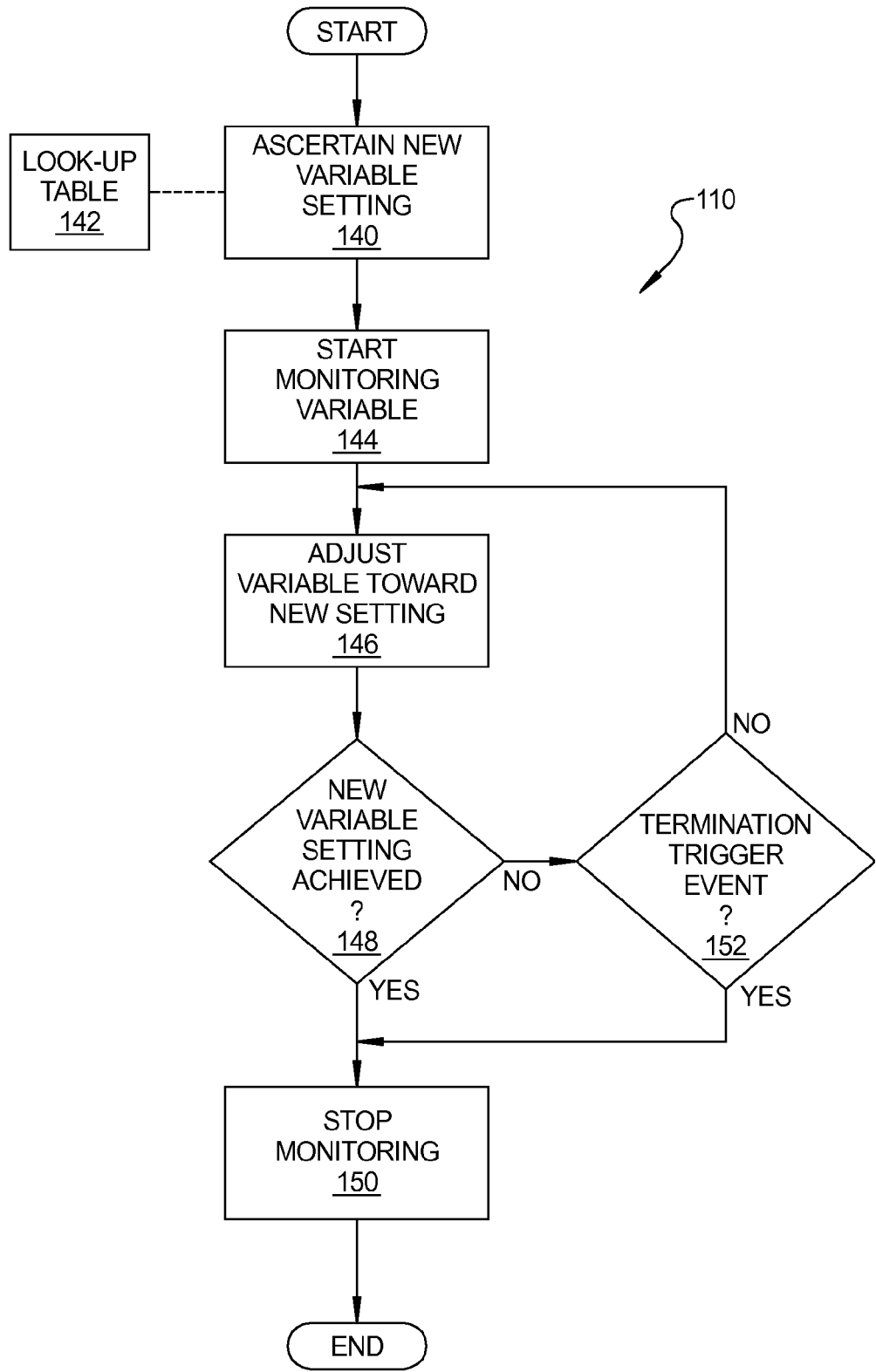
FIG. 5 is a flow chart illustrating a second control regime utilized by the control system according to the present teachings.

Referring now to FIG. 5, the second control regime 110 utilizes an open-loop control to change the operational state of component 24. The open-loop control of the second control regime 110 does not utilize or provide feedback of the actual operational state of component 24, as is done in first control regime 104. Rather, second control regime 110 uses an estimated or theoretical operational state of component 24 based on operation of the actuator as commanded by manipulator module 30. In particular, a variety of different variables may be operable to be adjusted that relate to operation of the actuator and impart a desired operational change in component 24. The particular variables that are operable to be changed to adjust the operational state of component 24 will vary depending upon the particular type of actuator utilized to adjust the operational position of component 24. For example, a counter-based variable may be utilized wherein changes in the counter correspond to operational changes in component 24. As another example, a voltage may be associated with the actuator and a change in the voltage can result in a corresponding change in the operational state of component 24. In yet another example, a magnetic field may be associated with the actuator such that a change in the magnetic field can cause a change in the operational state of component 24. In still another example, a time-based variable can be utilized wherein the actuator is operated for a particular period of time and results in an associated change in the operational state of component 24. It should be appreciated that other types of variables can also be utilized and that the above examples are non-limiting examples.

Regardless of the particular variable utilized, there is a theoretical relationship between that variable's influence on the actuator and the adjustment to the operational state of component 24. The second control regime 110 utilizes this theoretical relationship in adjusting the operational state of component 24 within the hysteresis band. During an implementation of second control regime 110, the actual new operational state of component 24 is not determined nor utilized. Thus, second control regime 110 is an open-loop control.

Regardless of the particular variable to be changed that is associated with the actuator and/or component 24, second control regime 110 starts with control ascertaining the change in the variable to achieve the desired operational state for component 24, as indicated in block 140. The appropriate change in the variable can be ascertained by algorithm module 28 using a relationship between the variable and the operational state of component 24. The relationship can be contained in a look-up table 142 that can be accessed by algorithm module 28. The look-up table 142 can have values that indicate that if X amount of change in the operational state of component 24 is desired, then adjusting the variable to (or by) Y would theoretically result in realizing that operational state. It should be appreciated that algorithm module 28 can use algorithm equations, models, and the like by, way of non-limiting example, to ascertain the appropriate change in the variable to achieve a desired operational state of component 24 in lieu of look-up table 142. The change in the operational state of component 24 is typically a small change that resides within the hysteresis band of component 24 and/or control system 20.

Control then commands a start of the monitoring of the variable being changed, as indicated in block 144. The monitoring is utilized to track the change in the variable, such as number of counts, voltage, magnetic field, time, etc., by way of non-limiting example. With the monitoring started, control then commands adjustment of the variable toward the new setting Y, as indicated in block 146. As a result of the adjustment of the variable to the new setting, the operational state of component 24 will also change.

Control ascertains if the new variable setting has been achieved, as indicated in decision block 148. If the new variable setting has been achieved, monitoring of the variable stops, as indicated in block 150, operation of the second control regime 110 ends, and control returns to main control loop 98, as described below. If the new variable setting has not been achieved, as ascertained in decision block 148, control ascertains if a termination trigger event has occurred, as indicated in decision block 152. The termination trigger events can be the same as those described above with reference to first control regime 104 and decision block 124. If a termination trigger event has occurred, monitoring of the variable stops, as indicated in block 150, implementation of second control regime 110 ends, and control returns to main control loop 98, as described below.

If a termination trigger event has not occurred, as ascertained in decision block 152, control returns to block 146 and continues to adjust the variable to the new setting and continues changing the operational state of component 24 as long as the new variable setting has not been achieved, as indicated in decision block 148, and a termination trigger even has not occurred, as indicated in decision block 152.

At the end of second control regime 110, control returns to main control loop 98 and to block 164. In block 164, control calculates the net open-loop adjustment statistics for component 24 and the theoretical operational state of component 24 as if there were no hysteresis. The net open-loop adjustment statistic is a summation of the total amount of adjustments that component 24 has undergone in a particular direction and can be a positive or negative value depending upon the individual directions of the adjustment of component 24 during the adjustment of the variable as a result of implementing second control regime 110. For example, adjustment of the variable in a first direction can result in a positive change in the operational state of component 24 that is summed together for each time that the variable is moved in the first direction during the second control regime 110. Moving of the variable in a second, opposite direction can result in a negative operational adjustment to component 24 that is summed together for each adjustment of the variable in the second direction during implementation of the second control regime 110. The net open-loop adjustment statistic is then a sum of the net adjustment of component 24, and is directly proportional to the difference of the sums between the adjustments of the variable in the first direction and the adjustments of the variable in the second direction. The net open-loop adjustment statistic is utilized in decision block 108, as discussed above, to ascertain if the magnitude of the net adjustment to the operational state of component 24 exceeds a threshold. Additionally, the net open-loop adjustment statistics are limited to one or more continuous applications of second control regime 110 and that when first control regime 104 is implemented, the net open-loop adjustment statistics are cleared, as indicated in block 130, upon the conclusion of implementation of the first control regime 104.

The theoretical operational state of component 24 is the total theoretical change, both positive and negative, that component 24 has undergone, for each adjustment of the variable during implementation of second control regime 110 without being interrupted by an implementation of first control regime 104. The theoretical operational state calculated in block 164 is the sum of the initial starting operational state of component 24 at the beginning of the first implementation of second control regime 110 plus the theoretical change in the operational state that second control regime 110 has adjusted component 24 without being interrupted by an implementation of first control regime 104. The initial starting operational state is the last operational state ascertained in block 130 using feedback signal 40. The theoretical change in operational state is based on the relationship, used in block 140, between the adjustment to the variable and the resulting change in the operational state of component 24. Again, the changes in different directions can result in positive or negative additions to the change in the operational state and the total theoretical operational change takes this into account when ascertaining the new theoretical operational state of component 24. The theoretical operational state and theoretical change in the operational state associated with second control regime 110 are cleared (or maintained clear) after each implementation of first control regime 104, as indicated in block 130, described above.

After calculating the net open-loop adjustment statistics and theoretical operational state, as indicated in block 164, control determines if a system termination event has occurred, as indicated in decision block 132. If a system termination event has not occurred, control then ascertains if an operational change is needed, as indicated in decision block 100. In ascertaining whether an operational change is needed, control utilizes the theoretical operational state of component 24 as determined in block 164 because control has gone to decision block 100 immediately following an implementation of second control regime 110.

As stated above, implementation of the first and/or second control regimes 104, 110 can be terminated in the event of a termination trigger event, as ascertained in decision blocks 124, 152, respectively. Further, as stated above, one of the termination trigger events can be a time-out condition wherein a certain time period has passed prior to starting implementation of main control loop 96 anew. This time period can thus result in starting main control loop 98 anew at a particular frequency. It is anticipated that the loop rates of the first and second control regimes 104, 110 will be faster than the frequency at which main control loop 98 restarts. Preferably, first and second control regimes 104, 110 operate at loop rates such that at least two iterations of first and second control regimes 104, 110 can be implemented within the time period of the time-out termination trigger event.

In a preferred embodiment, a change in the operational state of component 24 is achieved by changing a position of component 24. For example, component 24 can be a control valve such as control valve 60 shown in FIG. 1. Additionally, when the adjustment to the operational state of component 24 is achieved by altering its position, the second control regime can preferably be a time-based movement of component 24.

Figure 6:
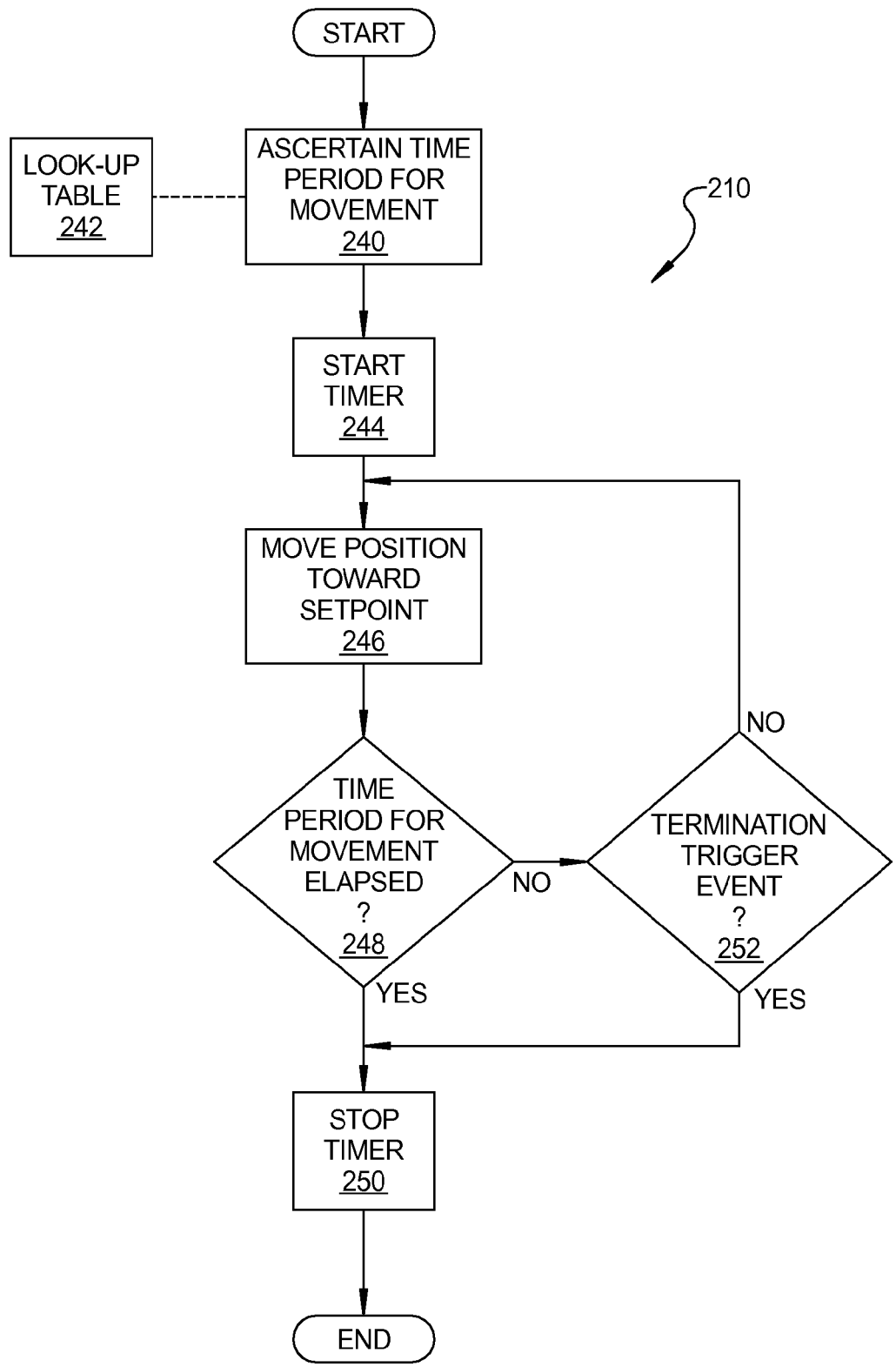
FIG. 6 is a flow chart illustrating a preferred embodiment of the second control regime utilized by the control system according to the present teachings.

Referring now to FIG. 6, an implementation of a second control regime 210 utilizing time-based movement of component 24, according to the present teachings, is shown. In this embodiment, second control regime 210 initiates position changes of component 24 using time-based movement. The second control regime 210 starts with control ascertaining a time period for movement of component 24, as indicated in block 240. The appropriate time period for movement can be ascertained by algorithm module 28 using a rate at which the position of component 24 can change as a function of time within control system 20. The relationship can be contained in a look-up table 242 that can be accessed by algorithm module 28. The look-up table 242 can have values that indicate that if X amount of change in the position of component 24 is desired, then operating actuator 76 for Y period of time would result in that movement. It should be appreciated that algorithm module 28 can use algorithm equations, models, and the like, by way of non-limiting example, to ascertain the appropriate time period to achieve a desired movement of component 24 in lieu of look-up table 242. The movement of component 24 is typically a small movement that resides within the hysteresis band of component 24 and/or control system 20.

Control then commands the start of a timer, as indicated in block 244. The timer is utilized to track the time period of movement of component 24. With the timer started, control then commands movement of the position of component 24 toward the setpoint, as indicated in block 246.

Control ascertains if the time period for movement of component 24 has elapsed, as indicated in decision block 248. If the time period for movement has elapsed, the timer is stopped, as indicated in block 250, operation of the second control regime 210 ends, and control returns to main control loop 98, as described below. If the time period for movement has not elapsed, as ascertained in decision block 248, control ascertains if a termination trigger event has occurred, as indicated in decision block 252. The termination trigger events can be the same as those described above with reference to first control regime 104 and decision block 124. If a termination trigger event has occurred, the timer is stopped, as indicated in block 250, implementation of second control regime 210 ends, and control returns to main control loop 98, as described below.

If a termination trigger event has not occurred, as ascertained in decision block 252, control returns to block 246 and continues to move the position of component 24 toward the setpoint. Second control regime 210 continues to move the position of component 24 toward the setpoint as long as the time period for movement has not elapsed, as indicated in decision block 248, and a termination trigger event has not occurred, as indicated block 252.

At the end of second control regime 210, control returns to main control loop 98 and to block 164. In block 164, control calculates the net time-based motion statistics for component 24 and the theoretical position of component 24 as if there were no hysteresis. The net time-based motion statistic is a summation of the total amount of motion that component 24 has been moved in a particular direction and can be a positive or negative value depending upon the individual directions of motion of component 24 and duration of motions as a result of implementing second control regime 210. For example, motion of component 24 in a first direction can result in positive motion that is summed together for each period of time that component 24 is moved in the first direction during the second control regime 210. Movement of component 24 in a second, opposite direction can result in negative motion that is summed together for each period of time that component 24 has moved in the second direction during implementation of the second control regime 210. The net time-based motion statistic is then a sum of the net motion of component 24, and is directly proportional to the difference of sums between the time periods that component 24 was moved in the first direction and the time periods that component 24 was moved in the second direction. The net time-based motion statistic is utilized in decision block 108, as discussed above, to ascertain if the magnitude of the net time-based motion exceeds a threshold. Additionally, the net time-based motion statistics are limited to one or more continuous applications of the second control regime 210 and that when first control regime 104 is implemented the net time-based motion statistics are cleared, as indicated in block 130 upon the conclusion of implementation of the first control regime 104.

The theoretical position change is the total theoretical position change, both positive and negative, that component 24 has undergone, for each time period of movement during implementation of second control regime 210 without being interrupted by an implementation of first control regime 104. The total theoretical position calculated in block 164 is the sum of the initial starting position of component 24 at the beginning of the first implementation of second control regime 210 plus the theoretical position change that second control regime 210 has moved component 24 without being interrupted by an implementation of first control regime 104. The initial starting position is the position last ascertained in block 130 using feedback signal 40. The theoretical position change is based on the relationship, used in block 240, between time and movement of component 24. Again, the movement in different directions can result in positive or negative additions to the position change and the total theoretical position change takes this into account when ascertaining the new theoretical position of component 24. The theoretical position and theoretical position change associated with second control regime 210 are cleared (or maintained cleared) after each implementation of first control regime 104, as indicated in block 130, described above.

Thus, in a preferred embodiment, second control regime 210 can utilize an open-loop control that is time-based. This usage is based upon a relationship between a time period of actuation of the actuator that changes the operational state of component 24 as a function of time. It should be appreciated that the specific steps performed in main control loop 98 and/or first control regime 104 can be altered to be consistent with the particular component and methodology utilized in second control regime 210.

Thus, a control system 20 according to the present teachings can implement various control regimes to adjust an operational state, such as a position by way of non-limiting example, of a component 24 to achieve a desired setpoint for a primary control target. Control system 20 can utilize a first control regime 104 when gross changes (changes greater than the hysteresis band threshold) in the operational state of component 24 are required or when the required change is in the same direction as the previous change and the last change was made with the first control regime 104. Control system 20 can utilize a second control regime when a required change is less than the hysteresis band threshold of component 24 and/or control system 20, and either the last change was not made with the first control regime 104 or the needed change is not in the same direction as the previous change. Additionally, implementation of the second control regime 110 can be limited so that it is not continuously implemented in a manner that results in the net open-loop change to exceed a threshold value. By utilizing two separate control regimes, more precise control of the operational state of component 24 can be achieved. This increased control precision can be achieved without requiring expensive linkages to reduce the hysteresis. In particular, the second control regime 110 can be utilized to provide changes within the hysteresis band such that the effects of hysteresis can be mitigated and/or eliminated.

Thus, the hysteresis mitigation and control method according to the present teachings utilizes either one of a first or second control regime to obtain a desired adjustment to the operational state of the component. In some situations, a first control regime is utilized which is a feedback-based adjustment to the component. In other situations, a second control regime is utilized which is an open-loop based adjustment to the operational state of the component. The time-based adjustment described above is one example of an open-loop system that can be utilized to implement the second control regime. Other open-loop systems can also be employed which may or may not be time-based. By way of non-limiting examples, other types of open-loop systems include counter-based systems, pulses from various components, drive counts, etc. As used herein, the term "open-loop adjustment" refers to an adjustment to the component wherein a feedback directly related to the component is not received and precise information about the current operational state of the component is not available. Rather, any attempt to ascertain the actual operational state of the component is based upon relationships utilized in the open-loop control. Thus, the open-loop, time-based control of component 24 described above is an exemplary embodiment of an open-loop control regime according to the principles of the present teachings.

It should be appreciated that while the preceding description of the present teachings were made by way of specific examples and embodiments, that such embodiments and examples are merely exemplary in nature and that changes thereto can be made and still be within the spirit and scope of the present teachings. For example, while component 24 is shown as being a control valve 60, other automatically actuated devices can be utilized. Additionally, while the adjustment is described as being linear, non-linear adjustment can also be accommodated. Additionally, while the preferred second control regime 210 is shown as being time-based, it should be appreciated that second control regime 210 could instead be based on any secondary measure associated with movement of the actuator 76 or actuator link 74, or the like, that provides a measure of the actuator motion, excluding the feedback sensor 80. By way of non-limiting examples, the linear actuator may be comprised of a stepper motor, and the number of steps or revolutions can be monitored, or the actuator may be comprised of a gear set, and the number of revolutions of a gear may be monitored, or a pulsed signal may be used to drive the actuator, and the number of pulses may be counted. Thus, the specific examples, illustrations, and embodiments disclosed herein are merely representative in nature, and changes and alterations should be considered to be within the scope of the present teachings and the claims.

What is claimed is:

1. A hysteresis mitigation and control method for a system having an adjustable component, the method comprising:
   (a) determining if a change in an operational state of the component is required;
   (b) ascertaining whether to implement a first control regime or a second control regime when said determination is indicative of a required change; and
   (c) implementing one of said first and second control regimes based on said ascertainment,
   wherein said first control regime is a closed-loop feedback-based adjustment to the component and said second control regime is an open-loop based adjustment to the component.

2. The method of claim 1, wherein ascertaining includes comparing said required change to a hysteresis characteristic of at least one of the component and the system, and implementing includes implementing one of said first and second control regimes based on said comparison to said hysteresis characteristic.

3. The method of claim 2, wherein said hysteresis characteristic is a hysteresis band threshold for at least one of the component and the system and implementing includes implementing said first control regime when said required change is greater than said hysteresis band threshold and implementing said second control regime when said required change is equal to or less than said hysteresis band threshold.

4. The method of claim 2, wherein ascertaining further includes ascertaining if an immediately preceding adjustment to the component was performed using said first control regime and ascertaining if said required change is in a same direction as said immediately preceding adjustment, and implementing further includes implementing said first control regime if said immediately preceding adjustment was performed using said first control regime and said required change is in said same direction and implementing said second control regime if said immediately preceding adjustment was not performed using said first control regime or said required change is not in said same direction.

5. The method of claim 4, wherein ascertaining further includes ascertaining whether a net open-loop change threshold has been exceeded, and implementing further includes implementing said first control regime if said net open-loop change threshold has been exceeded and implementing said second control regime if said net open-loop change threshold has not been exceeded.

6. The method of claim 5, wherein ascertaining whether said net open-loop change threshold has been exceeded includes comparing a total net change in an operational state of said component during operation of said second control regime without an intervening implementation of said first control regime to said net open-loop change threshold.

7. The method of claim 1, wherein said open-loop based adjustment is an open-loop, time-based adjustment, implementing said second control regime includes ascertaining a time period for adjustment of the component, adjusting the component for said time period, and ceasing operation of said second control regime when said time period has elapsed.

8. The method of claim 7, wherein said time period for adjustment is based on a relationship between a rate at which the component can be adjusted as a function of time.

9. The method of claim 7, wherein implementing said second control regime includes initiating a timer and using said timer to monitor a time duration of adjusting of the component.

10. The method of claim 7, wherein after ceasing implementation of said second control regime the method further comprises calculating a theoretical operational state of the component based on an actual time period of adjustment during implementation of said second control regime and repeating steps (a)-(c) using said theoretical operational state of the component.

11. The method of claim 1, wherein implementing said second control regime includes ascertaining a new setting for a variable to achieve a desired operational state of the component, adjusting said variable toward said new setting, and ceasing operation of said second control regime when said new setting has been achieved.

12. The method of claim 11, wherein said new variable setting is based on a relationship between said variable and said operational state of the component.

13. The method of claim 11, wherein implementing said second control regime further includes checking for a termination event and ceasing operation of said second control regime when a termination event is detected.

14. The method of claim 11, wherein after ceasing implementation of said second control regime the method further comprises calculating a theoretical operational state of the component based on adjustments to said variable during implementation of said second control regime and repeating steps (a)-(c) using said theoretical operational state of the component.

15. The method of claim 1, wherein implementing said first control regime includes ascertaining a setpoint for the component, adjusting the component toward said setpoint, monitoring adjustment of the component with a feedback signal indicative of the operational state of the component, comparing said monitored operational state of the component to said setpoint, and ceasing implementation of said first control regime when said comparison is within a predetermined tolerance.

16. The method of claim 15, wherein after ceasing implementation of said first control regime the method further comprises clearing open-loop adjustment statistics from implementation of said second control regime, ascertaining an operational state of the component using said feedback signal, and repeating steps (a)-(c) using said ascertained operational state of the component.

17. A system comprising:
a component having an adjustable operational state; and
a control module controlling adjustment of said component, wherein said module:
determines if a change in an operational state of the component is required;
ascertains whether to implement a first control regime or a second control regime when it is determined that a change is required; and
implements one of said first and second control regimes when adjusting the operational state of said component,
wherein said first control regime is a closed-loop feedback-based adjustment to said component and said second control regime is an open-loop based adjustment to said component.

18. The system of claim 17, wherein when ascertaining said module compares said required change to a hysteresis characteristic of at least one of said component and the system, and said module implements one of said first and second control regimes based on said comparison to said hysteresis characteristic.

19. The system of claim 17, wherein said hysteresis characteristic is a hysteresis band threshold for at least one of said component and the system and said module implements said first control regime when said required change is greater than said hysteresis band threshold and implements said second control regime when said required change is equal to or less than said hysteresis band threshold.

20. The system of claim 17, wherein said module ascertains if an immediately preceding adjustment to said component was performed using said first control regime and ascertains if said required change is in a same direction as said immediately preceding adjustment, and said module implements said first control regime if said immediately preceding adjustment was performed using said first control regime and said required change is in said same direction and implements said second control regime if said immediately preceding adjustment was not performed using said first control regime or said required change is not in said same direction.

21. The system of claim 20, wherein said module ascertains whether a net open-loop based threshold has been exceeded, and said module implements said first control regime if said net open-loop based threshold has been exceeded and implements said second control regime if said net open-loop based threshold has not been exceeded.

22. The system of claim 21, wherein said module compares a total net change in an operational state of said component during operation of said second control regime without an intervening implementation of said first control regime to said net open-loop based threshold when ascertaining whether said net open-loop based threshold has been exceeded.

23. The system of claim 17, wherein said open-loop based adjustment is an open-loop, time-based adjustment, said module when implementing said second control regime ascertains a time period for adjustment of said component, adjusts said component for said time period, and ceases operation of said second control regime when said time period has elapsed.

24. The system of claim 23, wherein said time period for adjustment is based on a relationship between a rate at which said component can be adjusted as a function of time.

25. The system of claim 23, wherein said module initiates a timer and uses said timer to monitor a time duration of adjusting of said component when implementing said second control regime.

26. The system of claim 23, wherein after ceasing implementation of said second control regime said module calculates a theoretical operational state of said component based on an actual time period of adjustment during implementation of said second control regime and uses said theoretical operational state of said component when controlling adjustment of said component.

27. The system of claim 17, wherein said module when implementing said second control regime ascertains a new setting for a variable to achieve a desired operational state of said component, adjusts said variable toward said new setting, and ceases operation of said second control regime when said new setting has been achieved.

28. The system of claim 27, wherein said new variable setting is based on a relationship between said variable and said operational state of said component.

29. The system of claim 27, wherein when implementing said second control regime said module checks for a termination event and ceases operation of said second control regime when a termination event is detected.

30. The system of claim 27, wherein after ceasing implementation of said second control regime said module calculates a theoretical operational state of said component based on adjustments to said variable during implementation of said second control regime and uses said theoretical operational state of said component when controlling adjustment of said component.

31. The system of claim 17, wherein when implementing said first control regime said module ascertains a setpoint for said component, adjusts said component toward said setpoint, monitors adjustment of said component with a feedback signal indicative of the operational state of said component, compares said monitored operational state of said component to said setpoint, and ceases implementation of said first control regime when said comparison is within a predetermined tolerance.

32. The system of claim 31, wherein after ceasing implementation of said first control regime said module clears open-loop based adjustment statistics from implementation of said second control regime, ascertains an operational state of said component using said feedback signal, and uses said ascertained operational state of said component when controlling adjustment of said component.

* * * * *